(12) United States Patent
Shimazoe et al.

(10) Patent No.: US 9,090,024 B2
(45) Date of Patent: Jul. 28, 2015

(54) METHOD FOR PRODUCING MOLDED GASKET

(75) Inventors: Toshihiro Shimazoe, Fujisawa (JP); Shigeru Watanabe, Fujisawa (JP)

(73) Assignee: NOK Corporation (JP)

( * ) Notice: Subject to any disclaimer, the term of this patent is extended or adjusted under 35 U.S.C. 154(b) by 382 days.

(21) Appl. No.: 13/819,012

(22) PCT Filed: Jul. 26, 2011

(86) PCT No.: PCT/JP2011/066887
§ 371 (c)(1),
(2), (4) Date: Feb. 26, 2013

(87) PCT Pub. No.: WO2012/029444
PCT Pub. Date: Mar. 8, 2012

(65) Prior Publication Data
US 2013/0154150 A1    Jun. 20, 2013

(30) Foreign Application Priority Data

Sep. 3, 2010   (JP) ................................ 2010-197682
Mar. 16, 2011  (JP) ................................ 2011-057350

(51) Int. Cl.
*B29C 45/14* (2006.01)
*H01M 8/02* (2006.01)
(Continued)

(52) U.S. Cl.
CPC ........... *B29C 63/481* (2013.01); *B29C 45/0055* (2013.01); *B29C 45/14336* (2013.01); *B29C 45/14344* (2013.01); *H01M 8/0276* (2013.01); *H01M 8/0286* (2013.01); *B29C 2045/0058* (2013.01); *B29C 2045/0077* (2013.01);
(Continued)

(58) Field of Classification Search
CPC ..................... B29C 45/0055; B29C 45/14336; B29C 45/14344; B29C 2045/0058; B29C 2045/0077; B29C 2045/14459; B29C 2045/14967; B29L 2031/265; B29L 2031/3468; H01M 8/0271; H01M 8/0276; H01M 2/028; H01M 8/0284; H01M 8/0286; Y02E 60/50
See application file for complete search history.

(56) References Cited

U.S. PATENT DOCUMENTS 6,057,054 A * 5/2000 Barton et al. ................. 429/483
7,008,584 B2   3/2006 Inoue et al.
(Continued)

FOREIGN PATENT DOCUMENTS

CN     101946348 A       1/2011
DE     11-2009-000381 T5  1/2011
(Continued)

*Primary Examiner* — Michael Tolin
(74) *Attorney, Agent, or Firm* — Harness, Dickey & Pierce, P.L.C.

(57) ABSTRACT

In a method for producing a molded gasket having a surface treated layer on one surface of a substrate and integrally formed with a gasket body constructed by a rubber-like elastic body on the other surface, a first step of integrally molding the gasket body on the substrate, a second step of temporarily placing the molded piece on a placement stand, and a third step of removing a burr portion from a production portion by punching the molded piece are sequentially executed. For preventing foreign material attachment, pollution and scratching, the first step integrally forms a projecting leg portion constructed by a rubber-like elastic body at a position corresponding to the burr portion in the molded piece, the second step brings the molded piece into contact with the placement stand by the leg portion, and the third step removes the leg portion as a part of the burr portion.

13 Claims, 14 Drawing Sheets

(51) Int. Cl.
*B29C 63/48* (2006.01)
*B29C 45/00* (2006.01)
*B29L 31/34* (2006.01)
*B29L 31/26* (2006.01)

(52) U.S. Cl.
CPC .......... *B29C2045/14459* (2013.01); *B29C 2045/14967* (2013.01); *B29L 2031/265* (2013.01); *B29L 2031/3468* (2013.01); *Y02E 60/50* (2013.01)

(56) References Cited

U.S. PATENT DOCUMENTS

| | | | |
|---|---|---|---|
| 7,491,355 | B2 | 2/2009 | Inoue et al. |
| 8,313,681 | B2 * | 11/2012 | Watanabe ............... 264/273 |
| 2002/0122970 | A1 | 9/2002 | Inoue et al. |
| 2006/0108709 | A1 | 5/2006 | Inoue et al. |
| 2007/0042255 | A1 * | 2/2007 | Jung et al. ............... 429/35 |
| 2008/0124458 | A1 | 5/2008 | Okabe |
| 2011/0236786 | A1 | 9/2011 | Iizuka et al. |

FOREIGN PATENT DOCUMENTS

| | | |
|---|---|---|
| JP | 2002-237317 A | 8/2002 |
| JP | 2006-107798 A | 4/2006 |
| JP | 2007-066766 A | 3/2007 |
| JP | 2007-157559 A | 6/2007 |
| JP | 2009-199888 A | 9/2009 |
| WO | WO-2009-104504 A1 | 8/2009 |
| WO | WO 2009/142082 A1 * | 11/2009 |

* cited by examiner

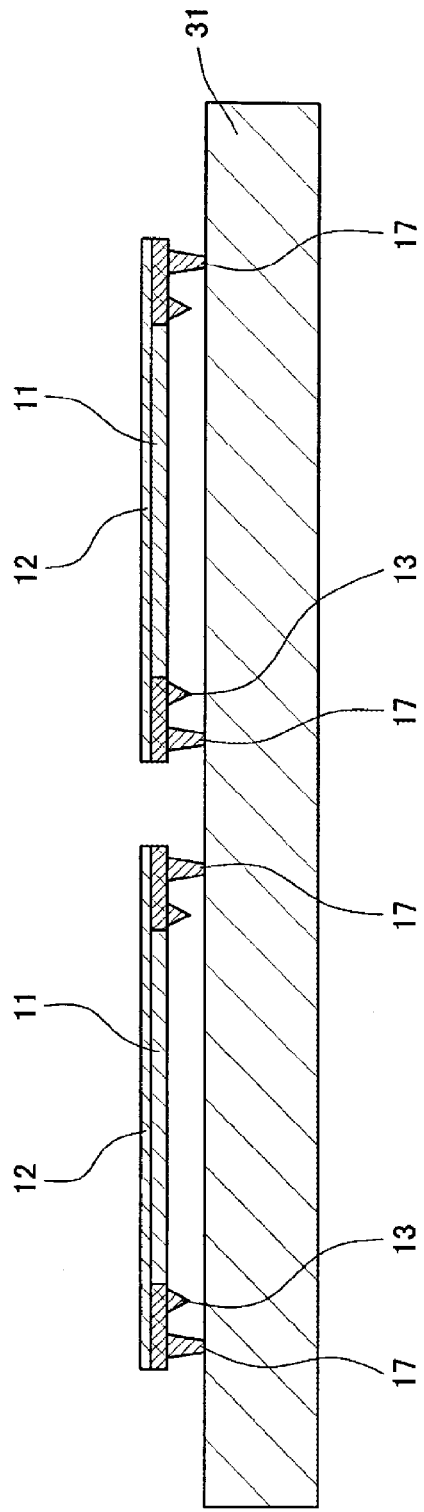

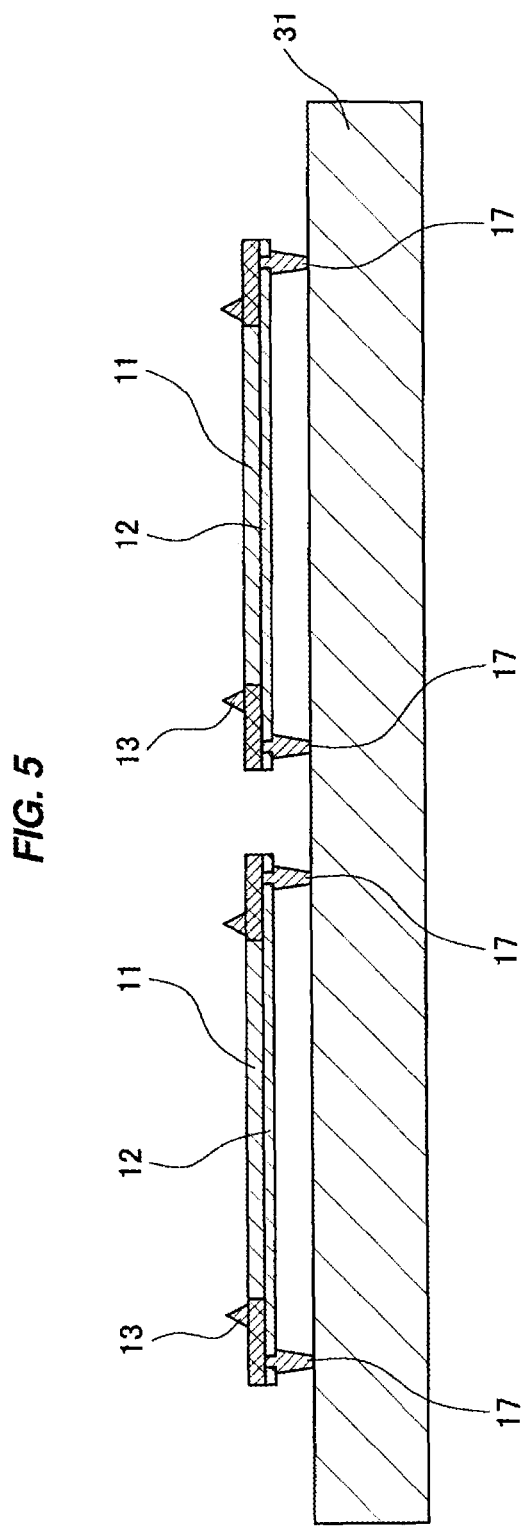

METHOD FOR PRODUCING MOLDED GASKET

CROSS-REFERENCE TO RELATED APPLICATIONS

This application is a U.S. National Stage Application of International Application No. PCT/JP2011/066887 filed on Jul. 26, 2011, and published in Japanese as WO 2012/029444 A1 on Mar. 8, 2012. This application claims priority to Japanese Application No. 2010-197682 filed Sep. 3, 2010 and Japanese Application No. 2011-057350 filed Mar. 16, 2011. The disclosures of the above applications are incorporated herein by reference.

BACKGROUND OF THE INVENTION

1. Field of the Invention

The present invention relates to a molded gasket according to a sealing technique, and more particularly to a method for producing the same.

2. Description of the Conventional Art

Conventionally, there has been known a molded gasket (a GDL integrated seal) structured such that a gas diffusion layer (GDL) is inserted into a metal mold, and a gasket body constructed by a rubber-like elastic body is integrally formed with the GDL according to an injection molding. A micro porous layer (MPL) treatment is generally applied to the GDL mainly for the purpose of water management, and the rubber can be integrally formed with the MPL treated GDL.

FIGS. 13A and 13B show an example of this kind of prior art, a GDL 11 is provided as a substrate, and an MPL layer 12 is provided as a surface treated layer on one surface 11a in a thickness direction of the GDL 11. Further, a gasket body 13 constructed by a rubber-like elastic body is integrally formed as a rip-like element on the other surface 11b in the thickness direction of the GDL 11.

In producing the molded gasket (the GDL integrated seal), molded pieces after a primary vulcanization are placed and arranged on a placement stand 31 such as a net rack or the like normally by setting the one surface 11a in the thickness direction of the GDL 11 having the MPL layer 12 downward, as shown in FIG. 14. The molded pieces are not arranged by setting downward the other surface 11b in the thickness direction of the GDL 11 with which the gasket body 13 constructed by the rubber-like elastic body in the opposite side is integrally formed, for preventing foreign material from attaching to the gasket body 13 from the placement stand 31, preventing the gasket body 13 from being polluted, and preventing a pattern of the placement stand 31 from being transcribed to the rubber (for example, preventing a net pattern from being transcribed to the rubber, in the case of the net rack).

However, in the case of arranging by setting downward the one surface 11a in the thickness direction of the GDL 11 having the MPL layer 12 as mentioned above, the MPL layer 12 comes into contact with the placement stand 31. Accordingly, there is a risk that problems such as the foreign material attachment, the pollution and scratching may be generated in the MPL layer 12. Therefore, in order to dissolve the problems, a resin protection sheet 32 has been conventionally put on the placement stand 31 as illustrated, and the molded pieces have been arranged on the sheet 32. As the protection sheet 32, a non-electrostatic property (dust prevention), a non-staining property and a heat resisting property (at a time of a secondary vulcanizing step) are required, and it is necessary to select a very expensive material. Further, it is necessary to periodically wash and replace, and a yield ratio is lowered, thereby causing a cost increase.

SUMMARY OF THE INVENTION

Problem to be Solved by the Invention

The present invention is made by taking the points mentioned above into consideration, and an object of the present invention is to provide a method for producing a molded gasket which is provided with a surface treated layer on one surface in a thickness direction of a substrate and is structured such that a gasket body constructed by a rubber-like elastic body is integrally formed on the other surface in the thickness direction, wherein the method for producing the molded gasket can effectively suppress foreign material attachment, pollution and scratching on the surface treated layer as well as the gasket body, at a time of temporarily placing the molded pieces on a placement stand.

Means for Solving the Problem

In order to achieve the object mentioned above, a method for producing a molded gasket according to the first aspect of the present invention is a method for producing a molded gasket which is provided with a surface treated layer on one surface in a thickness direction of a substrate and is structured such that a gasket body constructed by a rubber-like elastic body is integrally formed on the other surface in the thickness direction, comprising:

a first step of integrally molding the gasket body on the substrate which is provided with the surface treated layer;

a second step of temporarily placing the molded piece finishing the first step on a placement stand;

a third step of removing a burr portion in a peripheral edge from a production portion by punching the molded piece finishing the second step; and sequentially executing the first step, the second step and the third step, wherein the first step integrally forms a projecting leg portion constructed by a rubber-like elastic body at a position corresponding to the burr portion in the molded piece, the second step brings the molded piece into contact with the placement stand by the leg portion, and the third step removes the leg portion as a part of the burr portion.

Further, a method for producing a molded gasket according to the second aspect of the present invention is the producing method described in the first aspect mentioned above, wherein the leg portion is integrally molded on the other surface in the thickness direction on the substrate in the same manner as the gasket main body, and the leg portion is formed in such a manner that a height dimension thereof becomes larger than that of the gasket main body.

Further, a method for producing a molded gasket according to the third aspect of the present invention is the producing method described in the second aspect mentioned above, wherein the leg portion and the gasket main body are integrally molded via a rubber impregnated portion which is impregnated with a porous structure provided in the substrate.

Further, a method for producing a molded gasket according to the fourth aspect of the present invention is the producing method described in the first aspect mentioned above, wherein the leg portion is integrally molded on the one surface in the thickness direction which is provided with the surface treated layer in the substrate in contradiction to the gasket body.

Further, a method for producing a molded gasket according to the fifth aspect of the present invention is the producing method described in the fourth aspect mentioned above, wherein the leg portion and the gasket body are integrally formed via a rubber impregnated portion which is impregnated with a porous structure provided in the substrate, and a rubber filled portion which is filled in a through hole provided on the surface treated layer.

Further, a method for producing a molded gasket according to the sixth aspect of the present invention is the producing method described in the fourth aspect mentioned above, wherein the leg portion and the gasket body are integrally molded via a rubber impregnated portion which is impregnated with a porous structure provided in the substrate, and a rubber impregnated portion which is impregnated with a porous structure provided in the surface treated layer.

Further, a method for producing a molded gasket according to the seventh aspect of the present invention is the producing method described in the first aspect mentioned above, wherein the first to third steps are sequentially executed in a state in which the surface treated layer is coated with a protection film so as to protect the surface treated layer.

Further, a method for producing a molded gasket according to the eight aspect of the present invention is the producing method described in the seventh aspect mentioned above, wherein the leg portion is integrally formed on the one surface in the thickness direction which is provided with the surface treated layer in the substrate in contradiction to the gasket body, and the leg portion and the gasket body are integrally formed via a rubber impregnated portion which is impregnated with a porous structure provided in the substrate, a rubber impregnated portion which is impregnated with a porous structure provided in the surface treated layer, and a rubber filled portion which is filled in a through hole provided in the protection film.

Further, a method for producing a molded gasket according to the ninth aspect of the present invention is the producing method described in the seventh aspect mentioned above, wherein the leg portion is integrally formed with the one surface in the thickness direction which is provided with the surface treated layer in the substrate in contradiction to the gasket body, and the leg portion and the gasket body are integrally formed via a rubber impregnated portion which is impregnated with a porous structure provided in the substrate, a rubber filled portion which is filled in a through hole provided in the surface treated layer, and a rubber filled portion which is filled in a through hole provided in the protection film.

Further, a method for producing a molded gasket according to the tenth aspect of the present invention is the producing method described in any one of the seventh to ninth aspects mentioned above, wherein the protection film is constrained only by a part of the leg portion in place of all of the leg portion, so as to prevent deflection from being generated at a time of thermal expansion while taking into consideration difference in coefficient of thermal expansion between the protection film and the substrate.

Further, a method for producing a molded gasket according to the eleventh aspect of the present invention is the producing method described in any one of the first to tenth aspects mentioned above, wherein the substrate is a GDL in a fuel battery cell, and the surface treated layer is an MPL layer.

In the producing method according to the present invention having the structure mentioned above, at a time of producing the molded gasket which is provided with the surface treated layer on the one surface in the thickness direction of the substrate and structured such that the gasket body constructed by the rubber-like elastic body is integrally formed on the other surface in the thickness direction, the method sequentially executes the first step of integrally molding the gasket body on the substrate which is provided with the surface treated layer, the second step of temporarily placing the molded piece finishing the first step on the placement stand, and the third step of removing the burr portion in the peripheral edge from the production portion by punching the molded piece finishing the second step, however, the first step integrally forms the projecting leg portion constructed by the rubber-like elastic body at the position corresponding to the burr portion in the molded piece, and the second step brings the molded piece into contact with the placement stand by the leg portion. Accordingly, the molded piece comes into contact with the placement stand by the leg portion so as to come to a state in which the molded piece is supported by the leg portion in the second step, and the surface treated surface is away from the placement stand and does not come into contact with the placement stand. Therefore, the surface treated layer is hard to be involved in a problem, for example, the foreign material attachment, the pollution and the scratching caused by the contact with the placement stand. Since the leg portion is utilized in the second step at a time of producing the molded piece as mentioned above, and is not necessary in the product, the leg portion is removed as a part of the burr portion from the product portion, in the third step. The substrate includes comparatively soft films in addition to various plates.

Further, since the present invention targets at the molded gasket which is provided with the surface treated layer on the one surface in the thickness direction of the substrate and is structured such that the gasket body is integrally formed on the other surface in the thickness direction, there can be conceived a pattern (aspect) that the leg portion is integrally formed on the other surface in the thickness direction in the substrate in the same manner as the gasket body, and a pattern that the leg portion is integrally formed on the one surface in the thickness direction having the surface treated layer in the substrate on the contrary to the gasket body, at a time of integrally forming the leg portion for contacting in the placement as mentioned above, both the patterns are included in the present invention.

Among them, in the former pattern that the leg portion is integrally formed on the other surface in the thickness direction in the substrate in the same manner as the gasket body, the leg portion is formed such that the leg portion is greater in height than the gasket body so as to prevent the leg portion from coming into contact with the placement stand and prevent the gasket body from coming into contact with the placement stand at a time of temporarily placing. Accordingly, it is possible to suppress the contact of the gasket body with the placement stand even if the leg portion and the gasket body are integrally formed on the same surface in the substrate. Further, the leg portion and the gasket body may be formed as separate bodies from each other, however, in the case that the substrate has a porous structure, the leg portion and the gasket body may be integrally formed via a rubber impregnated body which is impregnated with the porous structure. The rubber molding step can be executed at one try by integrally forming as mentioned above.

In the latter case that the leg portion is integrally formed on the one surface in the thickness direction having the surface treated layer in the substrate on the contrary to the gasket body, the surface treated layer is interposed in addition to the substrate between the leg portion and the gasket body. If both the elements are integrally formed via the rubber impregnated portion which is impregnated with the porous structure provided in the substrate, and the rubber filled portion which is filled in the through hole provided in the surface treated layer, the rubber molding step can be executed at one try in the same manner as mentioned above. Further, in the case that the surface treated layer is provided with the porous structure in the same manner as the substrate, the rubber molding step can be executed at one try by integrally forming both the elements via the rubber impregnated portion which is impregnated with the porous structure provided in the substrate, and the rubber impregnated portion which is impregnated with the porous structure provided in the surface treated layer.

As mentioned above, according to the present invention, since the leg portion comes into contact with the placement stand and the surface treated layer does not come into contact with the placement stand, it is possible to protect the surface treated layer from the foreign material attachment, the pollution and the scratching, however, if the first to third steps are executed in a state in which the surface treated layer is coated with the protection film, it is possible to further effectively protect the surface treated layer from the foreign material attachment, the pollution and the scratching.

In the case that the surface treated layer is coated with the protection film as mentioned above, the protection film lies between the leg portion and the gasket body in addition to the substrate and the surface treated layer. If both the elements are integrally formed via the rubber impregnated portion which is impregnated with the porous structure provided in the substrate, the rubber filled portion which is filled in the through hole provided in the surface treated layer, and the rubber filled portion which is filled in the through hole provided in the protection film, it is possible to execute the rubber molding step at one try in the same manner as mentioned above. Further, in the case that the surface treated layer is provided with the porous structure in the same manner as the substrate, the rubber molding step can be executed at one try in the same manner by integrally forming both the elements via the rubber impregnated portion which is impregnated with the porous structure provided in the substrate, the rubber impregnated portion which is impregnated with the porous structure provided in the surface treated layer, and the rubber filled portion which is filled in the through hole provided in the protection film. The protection film is structured such as to be removed together with the burr portion at a time of the third step.

Further, in the case that the surface treated layer is coated with the protection film as mentioned above, it is necessary to pay attention to the following points.

In other words, since the leg portion is provided in such a manner as to prevent the surface treated layer from coming into contact with the placement stand, the leg portion is provided in such a manner that the leg portion can support a whole of the molded piece. However, if the leg portion is structured such that the leg portion constrains on plane the protection film wholly, a deflection may be generated in the molded piece at a time of thermal expansion since the protection film and the substrate have a difference in a coefficient of thermal expansion. Accordingly, the leg portion is structured such that the leg portion constrains the protection film on plane only partially in place of wholly, thereby letting loose the difference in the thermal expansion and suppressing generation of the deflection.

The molded gasket at which the present invention targets for producing is not limited particularly in its intended use, however, is suitable for being used as a fuel battery constructing part. In the case that the molded gasket is used as the fuel battery constructing part, the substrate is set, for example, to a GDL in the fuel battery cell, and the surface treated layer is set to an MPL layer.

Effect of the Invention

The present invention achieves the following effects.

In other words, since the temporarily placing second step is executed in the state in which the molded piece is supported by the leg portion as mentioned above in the producing method according to the present invention, the surface treated layer does not come into contact with the placement layer, and it is possible to effectively protect the surface treated layer from the foreign material attachment, the pollution and the scratching caused by the contact. Further, in the case of executing each of the steps in the state in which the surface treated layer is coated with the protection film, since the surface treated layer is protected by the protection film, it is possible to further effectively protect the surface treated layer. Further, the rubber molding step can be executed at one try in the case that the gasket body constructed by the rubber-like elastic body is integrally formed in the same manner as the leg portion constructed by the rubber-like elastic body, and it is possible to suppress the generation of the deflection in the molded piece due to the difference in the coefficient of thermal expansion in the case that the protection film is constrained by the leg portion only partly in place of wholly. Further, in the case that the molded gasket according to the present invention is the fuel battery constructing part, the operations and effects mentioned above can be obtained in a filed relating to the fuel battery constructing part.

BRIEF EXPLANATION OF THE DRAWINGS

FIGS. 1A and 1B are explanatory views of a producing method according to a first embodiment of the present invention, in which FIG. 1A is a plan view of a molded piece, and FIG. 1B is a vertical cross sectional view of the molded piece;

FIG. 2 is an explanatory view of the producing method according to the embodiment, and is an explanatory view of a second step;

FIGS. 4A and 4B are explanatory views of a producing method according to a second embodiment of the present invention, in which FIG. 4A is a plan view of a molded piece, and FIG. 4B is a vertical cross sectional view of the molded piece;

FIG. 5 is an explanatory view of the producing method according to the embodiment, and is an explanatory view of a second step;

FIGS. 7A and 7B are explanatory views of a producing method according to a third embodiment of the present invention, in which FIG. 7A is a plan view of a molded piece, and FIG. 7B is a vertical cross sectional view of the molded piece;

FIGS. 8A and 8B are explanatory views of a producing method according to a fourth embodiment of the present invention, in which FIG. 8A is a plan view of a molded piece, and FIG. 8B is a vertical cross sectional view of the molded piece;

FIGS. 9A and 9B are explanatory views of a producing method according to a fifth embodiment of the present invention, in which FIG. 9A is a plan view of a molded piece, and FIG. 9B is a vertical cross sectional view of the molded piece;

FIGS. 10A and 10B are explanatory views of the producing method according to the embodiment, in which FIG. 10A is an explanatory view of a first step, and FIG. 10B is a vertical cross sectional view showing a state in which a deflection is generated;

FIGS. 11A and 11B are explanatory views of a producing method according to a sixth embodiment of the present invention, in which FIG. 11A is a plan view of a molded piece, and FIG. 11B is a vertical cross sectional view of the molded piece;

FIGS. 13A and 13B are explanatory views of a producing method according to a conventional example, in which FIG. 13A is a plan view of a molded piece, and FIG. 13B is a vertical cross sectional view of the molded piece.

DETAILED DESCRIPTION OF PREFERRED EMBODIMENT

Figure 1A:
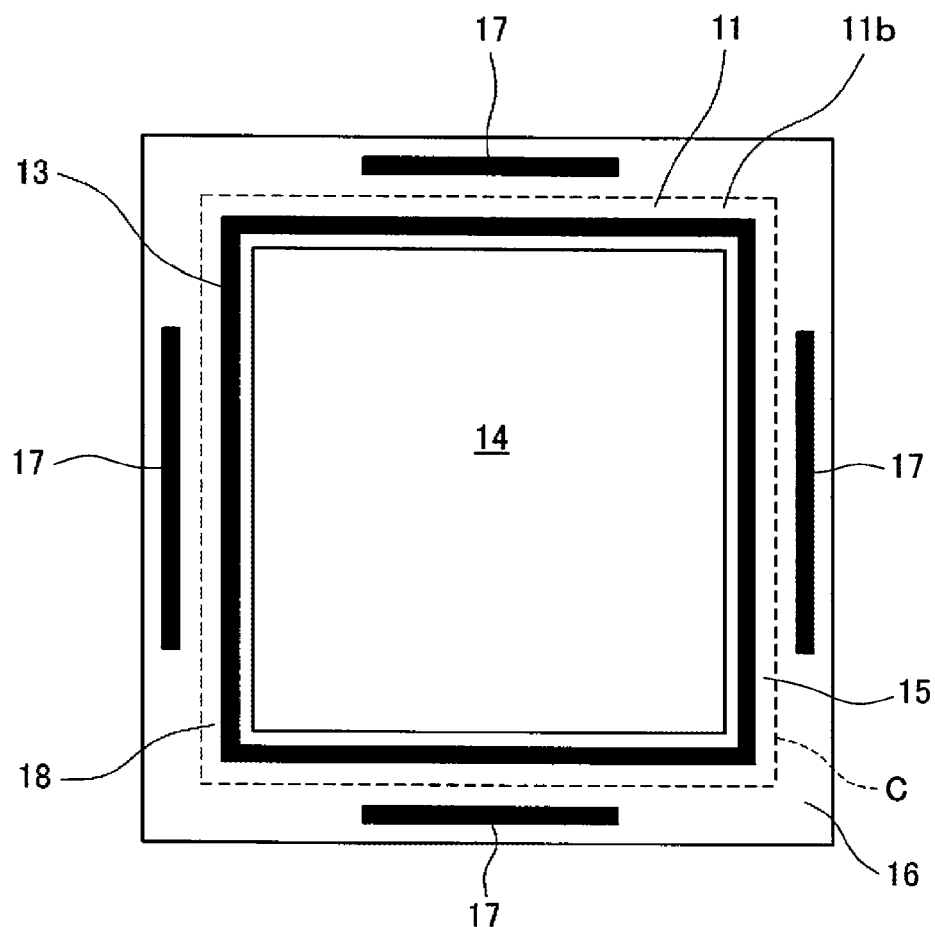

The following embodiments are included in the present invention.

(1)

(1-1) The present invention relates to a method of producing a GDL integrated seal and a film integrated seal which needs a punching step into a product shape. Further, the present invention aims at protection of a lip and a member to be integrated, forms a rubber projection portion for a base, and can be executed in the film integrated seal as well as the GDL integrated seal. Further, the present invention can be executed in the other field (for example, a general industrial gasket) than the gasket for the fuel battery.

(1-2) A rubber projection portion which is higher than a seal lip is simultaneously formed at a position which does not relate to a product portion independently from the seal lip. The lip does not come into contact with a placement stand by using the projection portion as the base, and the lip can be placed and arranged while being protected. Since the rubber projection portion is punched in a punching step into a product shape, the rubber projection portion does not present problems for a sealing function of the product. Further, the rubber projection portion can be arranged at an optional place as long as it serves as the base, and the rubber projection portion and the seal lip are not necessarily connected by impregnation. Further, it is possible to use as a vent for evacuation by arranging at a rubber meeting place at a time of molding. It is possible to use for protecting the MPL by inpouring the rubber into a back face of the GDL (an MPL treated surface) according to the impregnation or the through hole, and molding the rubber projection portion on the MPL surface. The rubber projection portion can be used as a mold releasing chuck for releasing from a metal mold after the molding.

(2)

(2-1) In the item (1) mentioned above, there is proposed the use for protecting the MPL by inpouring the rubber into the back face of the GDL (the MPL treated surface) according to the impregnation or the through hole, and molding the rubber projection portion on the MPL surface, however, a structure which further effectively prevent the contamination attachment and the scratch to the MPL will be proposed.

(2-2) In the formation of the molded piece, the MPL layer is inserted into the metal mold while being coated with a protection sheet (for example, a PP sheet having a non-electrostatic property (contamination prevention), a non-staining property and a heat resistance) so as to be formed. The protection sheet is previously provided with a through hole at a position which is opposed to the rubber projection portion, and a material is inpoured into a rubber projection portion cavity through the through hole at the same time of the impregnation of the rubber into the GDL according to an injection molding, whereby it is possible to integrally form while coating the MPL treatment with the protection sheet.

(2-3) However, in the case that it is intended to integrally form the GDL and the protection sheet according to the forming method, a deflection is generated in the product after being formed due to a difference in linear expansion between a room temperature and a high temperature if the difference in linear expansion exists between the GDL and the protection sheet (since both ends of the protection sheet are constrained by the rubber projection portion and follow the GDL). It is necessary to select a protection sheet having no difference in linear expansion for solving this, however, the GDL is in general thermally contracted due to an internal residual stress, and most of the protection sheet such as a resin film is thermally expanded. Therefore, it is extremely hard to select the protection sheet having no difference in linear expansion.

(2-4) Accordingly, one end of the protection sheet is structured such as to be let loose of the rubber projection portion. Since both ends are not constrained in the rubber projection portion, there is no risk that the product deflects even if the GDL and the protection sheet have any difference in linear expansion. Since the other end is integrated with the rubber projection portion, the protection sheet is not peeled from the GDL, and it is possible to handle the product while protecting the MPL layer. The projection portion and the protection sheet are removed in the final punching step.

(3)

(3-1) The present invention relates to the gasket for the fuel battery, and mainly aims at protection of the MPL surface of the impregnated and integrated gasket with the GDL on which the micro porous layer (MPL) is coated.

(3-2) The impregnation and integration forming of a liquid-like rubber is carried out by an injection molding to the GDL on which the MPL is coated (Japanese Unexamined Patent Publication No. 2006-107798).

(3-3) In the present invention, in a post step (a secondary vulcanization) of the forming or in a maintenance, the following steps are carried out:

(3-3-1) the lip is protected at a time of placing while setting the lip side to a lower side, by providing a higher projection than the lip in the lip side; and (3-3-2) the MPL is protected by providing the projection in the surface side on which the MPL is coated.

In both the structures, the projection portion is finally punched out.

(3-4) Further, in the present invention, the projection is provided in the both surface sides on which the MPL is coated, the MPL surface is further coated with the protection film for preventing the contamination from being attached, and the protection film is finally removed. If both sides are fixed by the rubber in a state in which heat is applied in the metal mold due to the difference in a thermal deformation level between the protection film (assumed as the resin film) and the GDL, the deflection is generated at a time of returning to the room temperature. Therefore, the GDL and the protection film are fixed only in one side. The protection film employs a film which is excellent in a mechanical strength and a heat resistance such as a PI film and a PEEK film for preventing the film from being thermally deformed in the metal mold due to a mold clamping and a molding temperature, and a thickness thereof is set to several tens μm.

(4)

If the film which is short of a mechanical strength is selected as the protection film, there is a case that a problem that the MPL treatment and the protection film are fixed by a mold clamping pressure is generated at a time when the film is deformed by the mold clamping at a time of molding, in accordance with the MPL treatment. Further, in a film which is short of a heat resistance (which is low in a glass transition point), there is a case that the film is thermally deformed in the metal mold so as to generate an MPL fixation, and an intended MPL protecting function can not be obtained. In these cases, it is better to use the film which is excellent in the mechanical characteristic and the heat resistance, such as the PI film and the PEEK film.

EMBODIMENT

Next, a description will be given of embodiments according to the present invention with reference to the accompanying drawings.

The embodiments shown below are all structured such as to produce a GDL integrated seal which is a fuel battery constructing part as a molded gasket, and the GDL integrated seal has a structure in which a micro porous layer (MPL layer) 12 is provided as a surface treated layer on one surface 11a in a thickness direction of a gas diffusion layer (GDL) 11 constructed by a porous structure as a substrate and a gasket body 13 constructed by a rubber-like elastic body is integrally formed on the other surface 11b in the thickness direction. The MPL layer 12 is constructed by a micro porous structure having a smaller porosity than the GDL 11 by definition, and is attached to the one surface 11a in the thickness direction of the GDL 11 over a whole surface for the purpose of water management in a fuel battery cell. On the other hand, the gasket body 13 is provided as an endless shaped structure in a peripheral edge portion of the GDL 11 in such a manner as to surround a periphery of a fuel gas reaction region portion 14 which is set in the center of a plane of the other surface 11b in the thickness direction of the GDL 11, and is further provided as a lip shaped structure which is formed as a chevron cross sectional shape. Further, the GDL integrated seal is produced by sequentially executing a first step of integrally forming the gasket body 13 on the other surface 11b in the thickness direction of the GDL 11 which is previously provided with the MPL layer 12 on the one surface 11a in the thickness direction in accordance with an injection molding by a metal mold, a second step of temporarily placing the molded piece after finishing the first step on a placement stand 31, and a third step of cutting out and removing a burr portion 16 over a whole periphery of a peripheral edge from a product portion 15 by punching the molded piece after finishing the second step by a press (the cutting and removing operation is carried out in a dotted line portion (a cut portion C) in each of the drawings, a position in an inner peripheral side is set to the product portion 15 and a position in an outer peripheral side is set to the burr portion 16).

First Embodiment

Figure 1B:
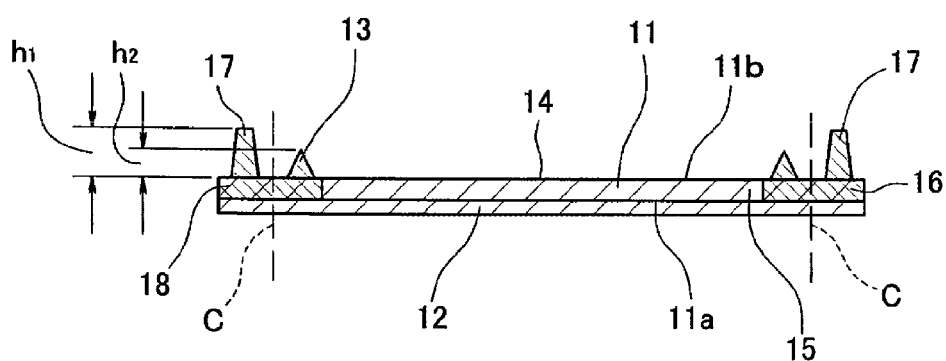
Figure 3:
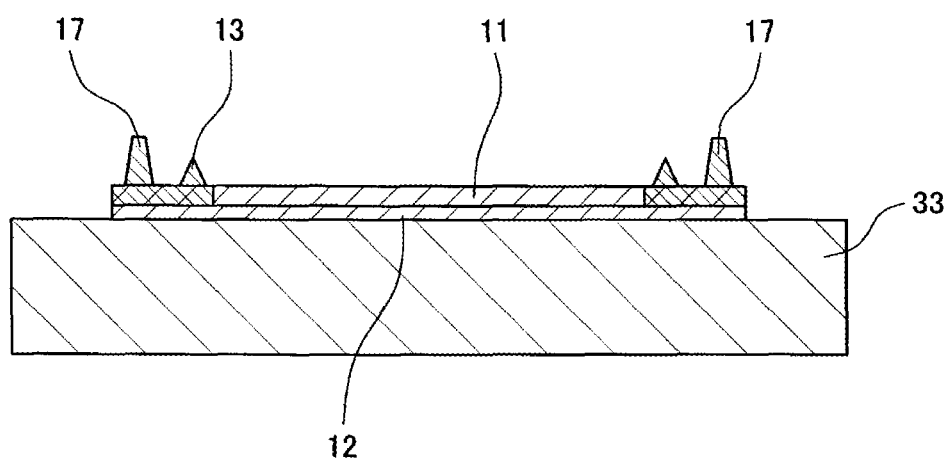
FIG. 3 is an explanatory view of the producing method according to the embodiment, and is an explanatory view showing a state in which a mold open is finished in a first step.

In a first embodiment, a projecting leg portion 17 constructed by a rubber-like elastic body is integrally formed at a position corresponding to the burr portion 16 in the molded piece as shown in FIGS. 1A and 1B in the first step, the molded piece is supported by the leg portion 17 by bringing the molded piece into contact with the placement stand 31 by the leg portion 17 as shown in FIG. 2 in the second step, and the leg portion 17 is cut out and removed as a part of the burr portion 16 from the product portion 15 as shown by a dotted line C in FIGS. 1A and 1B in the third step. In the first step, the leg portion 17 is integrally formed on the other surface 11b in the thickness direction in the GDL 11 in the same manner as the gasket body 13, is integrally formed in an outer peripheral side of the gasket body 13, and is further integrally formed as a predetermined length structure at one position in each of four sides in the GDL 11 formed as a rectangular plane shape. Further, the leg portion 17 is formed such that a height h1 thereof is larger than a height h2 of the gasket body 13. Further, the leg portion 17 and the gasket body 13 are integrally formed via a rubber impregnated portion 18 which is impregnated with a porous structure provided in the GDL 11. According to the structure mentioned above, since the second step for temporarily placing is executed in a state in which the molded piece is supported by the leg portion 17 as shown in FIG. 2, none of the MPL layer 12 and the gasket body 13 comes into contact with the placement stand 31. Therefore, it is possible to effectively protect the MPL layer 12 and the gasket body 13 from the foreign material attachment, the pollution and the scratching caused by the contact. The leg portion 17 can be utilized as a formed piece chuck portion at a time of mold releasing the molded piece from the metal mold 33, as shown in FIG. 3.

Second Embodiment

Figure 4A:
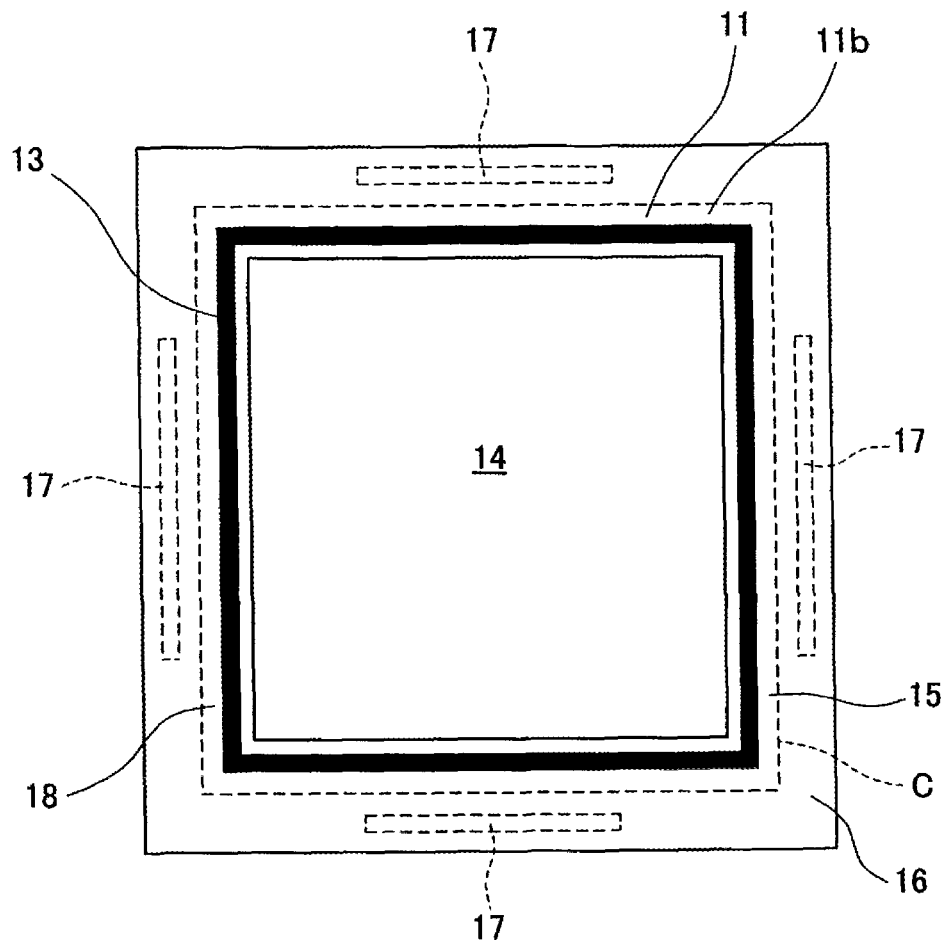
Figure 4B:
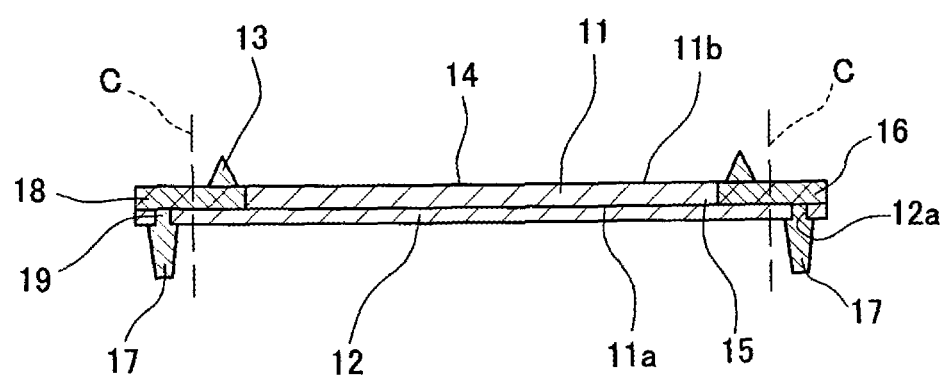
Figure 6:
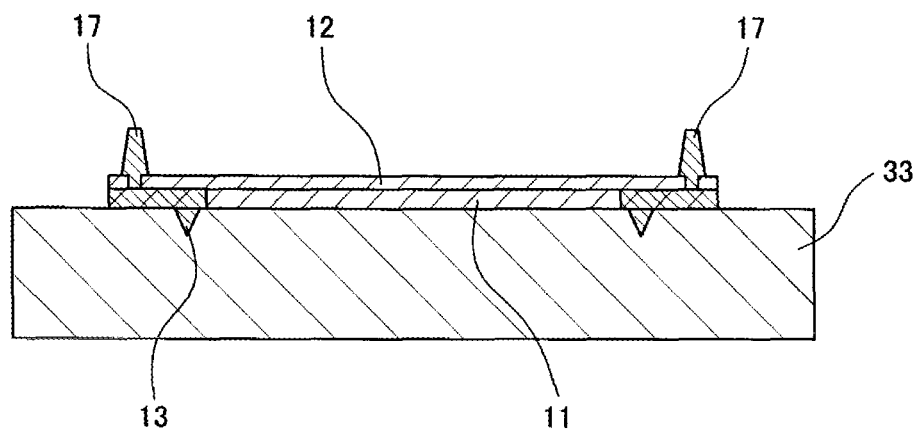
FIG. 6 is an explanatory view of the producing method according to the embodiment, and is an explanatory view showing a state in which a mold open is finished in a first step.

In a second embodiment, a projecting leg portion 17 constructed by a rubber-like elastic body is integrally formed at a position corresponding to the burr portion 16 in the molded piece as shown in FIGS. 4A and 4B in the first step, the molded piece is supported by the leg portion 17 by bringing the molded piece into contact with the placement stand 31 by the leg portion 17 as shown in FIG. 5 in the second step, and the leg portion 17 is cut out and removed as a part of the burr portion 16 from the product portion 15 as shown by a dotted line C in FIGS. 4A and 4B in the third step. In the first step, the leg portion 17 is integrally formed on the one surface 11a in the thickness direction provided with the MPL layer 12 in the GDL 11 (on the MPL layer 12) on the contrary to the gasket body 13, is integrally formed in an outer peripheral side of the gasket body 13, and is further integrally formed as a predetermined length structure at one position in each of four sides in the GDL 11 formed as a rectangular plane shape. A height of the leg portion 17 is not particularly limited. Further, the leg portion 17 and the gasket body 13 are integrally formed via a rubber impregnated portion 18 which is impregnated with a porous structure provided in the GDL 11, and a rubber filled portion 19 which is filled in a through hole 12a previously provided in the MPL layer 12. According to the structure mentioned above, since the second step for temporarily placing is executed in a state in which the molded piece is supported by the leg portion 17 as shown in FIG. 5, none of the MPL layer 12 and the gasket body 13 comes into contact with the placement stand 31. Therefore, it is possible to effectively protect the MPL layer 12 and the gasket body 13 from the foreign material attachment, the pollution and the scratching caused by the contact. The leg portion 17 can be utilized as a formed piece chuck portion at a time of mold releasing the molded piece from the metal mold 33, as shown in FIG. 6.

Third Embodiment

Figure 7A:
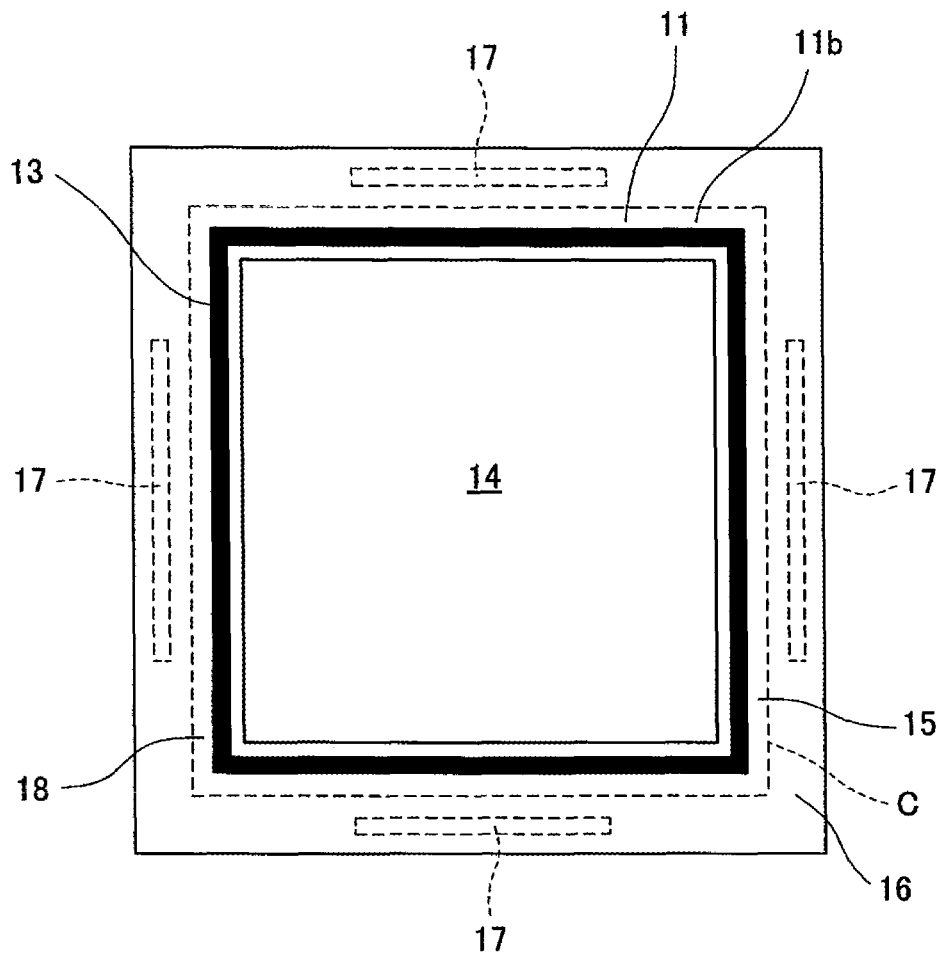
Figure 7B:
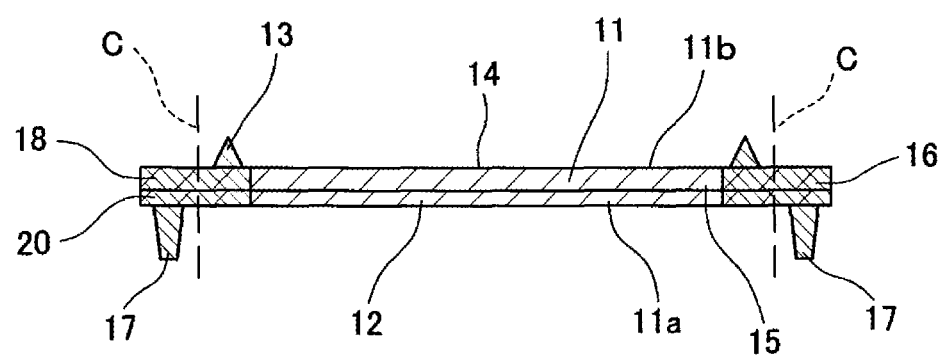

In the second embodiment mentioned above, the leg portion 17 and the gasket body 13 are integrally formed via the rubber impregnated portion 18 which is impregnated with the porous structure provided in the GDL 11, and the rubber filled portion 19 which is filled in the through hole 12a previously provided in the MPL layer 12 in the first step, however, the leg portion 17 and the gasket body 13 may be integrally formed via the rubber impregnated portion 18 which is impregnated with the porous structure provided in the GDL 11, and a rubber impregnated portion 20 which is impregnated with a porous structure provided in the MPL layer 12, as shown in FIG. 7 in place of this. The other structures and operational effects of the third embodiment are the same as those of the second embodiment.

Fourth Embodiment

Figure 8A:
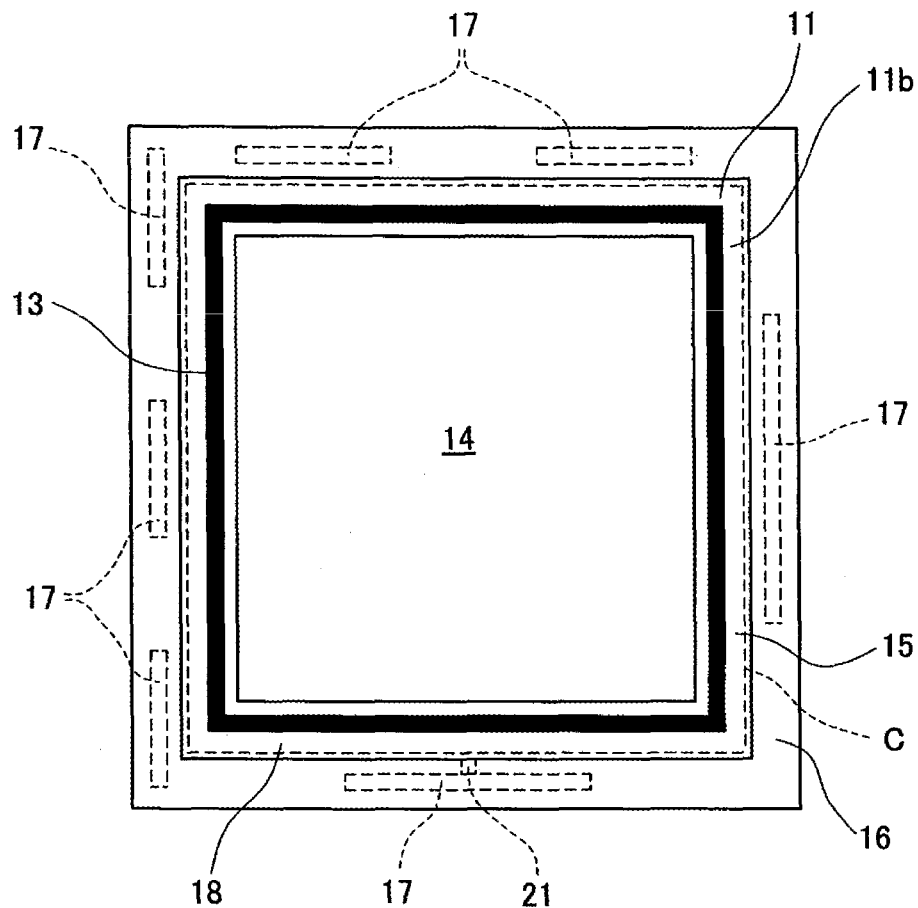
Figure 8B:
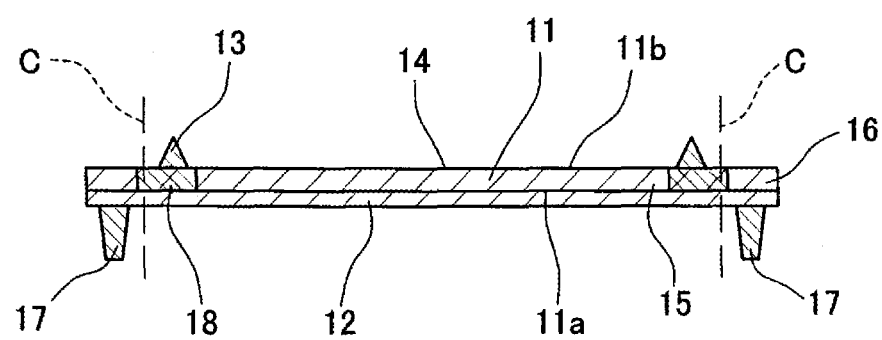

In the first to third embodiments, the leg portion 17 and the gasket body 13 are integrally formed via the rubber impregnated portions 18 and 20 and the rubber filled portion 19 in the first step, however, the leg portion 17 and the gasket body 13 may be formed as separate bodies in place of the integrated structure, as shown in FIG. 8. In this case, a metal mold structure becomes slightly complicated since a material flow route has different lines in the gasket body 13 and the leg portion 17, however, it is possible to select different kinds of materials for the leg portion 17 and the gasket body 13.

Further, in the first to third embodiments mentioned above, the leg portion 17 is integrally formed as the predetermined length structure at one position in each of four sides in the rectangular plane formed GDL 11 in the first step, however, an arrangement number, an arrangement position and a shape of the leg portion 17 are not particularly limited as long as the molded piece can be supported by the leg portion 17 in the second step. For example, there can be conceived that the leg portions are provided at a plurality of positions respectively in four sides in place of the provision at one position in each of four sides (provided at two positions in an upper side and at three positions in a left side in a plan view FIG. 8A), are provided only in two opposed sides in place of the provision in each of four sides, are provided as a dotted structure in place of the shape having the predetermined length and being in parallel to each of the sides, or are provided as dotted shapes at four corners of the rectangular plane shape.

Further, there can be conceived that the leg portion 17 (the leg portion forming portion in the metal mold structure) is utilized as an air vent relating to the rubber molding, by communicating the rubber impregnated portion 18 (or the rubber impregnated portions 18 and 20) and the leg portion 17 with a partial passage 21 (refer to a lower side in the plan view FIG. 8A) and arranging the leg portion 17 in a terminal end portion of a material flow route in the metal mold structure.

Fifth Embodiment

Figure 9A:
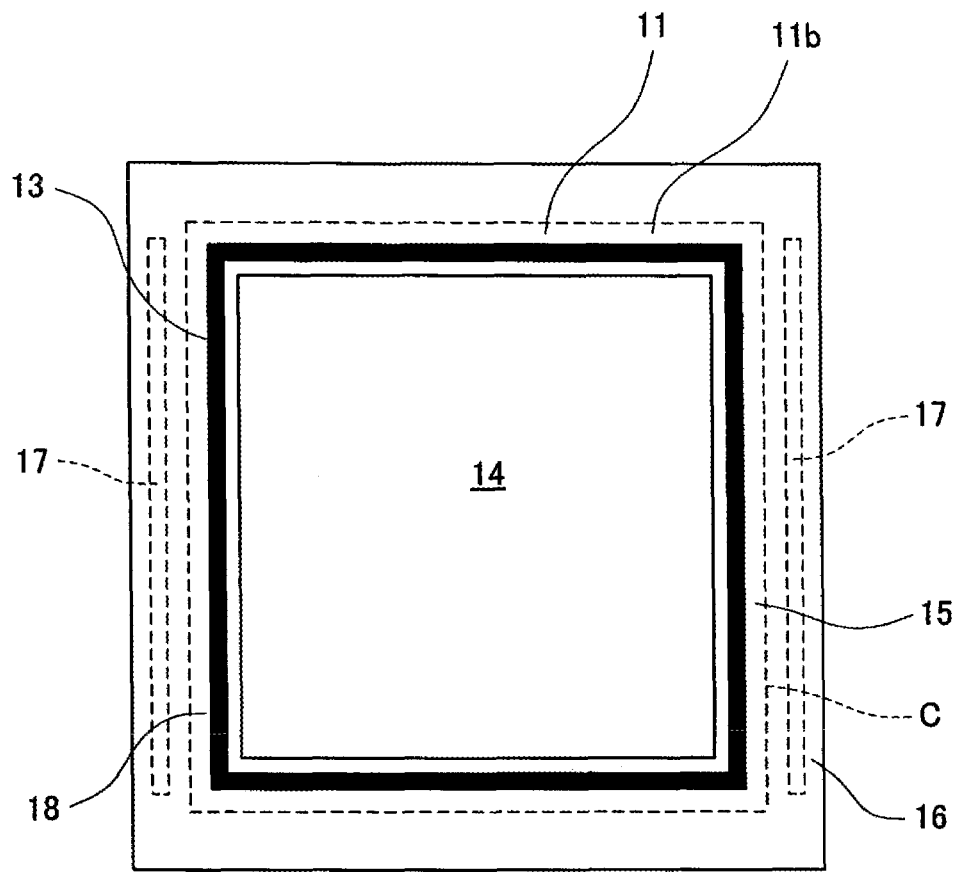
Figure 9B:
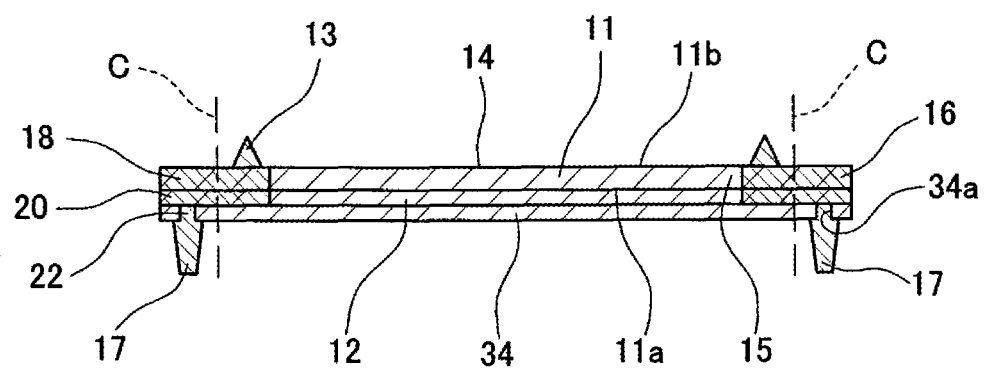

In a fifth embodiment, the first to third steps are sequentially executed in a state in which an MPL layer 12 serving as a surface treated layer is temporarily coated with a protection film 34 for protecting the MPL layer 12, as shown in FIGS. 9A and 9B.

Further, in the fifth embodiment, a projecting leg portion 17 constructed by a rubber-like elastic body is integrally formed at a position corresponding to the burr portion 16 in the molded piece as shown in FIGS. 9A and 9B in the first step, the molded piece is supported by the leg portion 17 by bringing the molded piece into contact with the placement stand 31 by the leg portion 17 in the second step, and the leg portion 17 is cut out and removed as a part of the burr portion 16 from the product portion 15 as shown by a dotted line C in FIGS. 9A and 9B in the third step. In the first step, the leg portion 17 is integrally formed on the one surface 11a in the thickness direction having the MPL layer 12 and the protection film 34 in the GDL 11 (on the protection film 34) on the contrary to the gasket body 13, is integrally formed in an outer peripheral side of the gasket body 13, and is further integrally formed as a predetermined length structure at one position in each of two opposed sides in the GDL 11 formed as a rectangular plane shape. The height of the leg portion 17 is not particularly limited. Further, the leg portion 17 and the gasket body 13 are integrally formed via a rubber impregnated portion 18 which is impregnated with a porous structure provided in the GDL 11, a rubber impregnated portion 20 which is impregnated with a porous structure provided in the MPL layer 12, and a rubber filled portion 22 which is filled in a through hole 34a previously provided in the protection film 34. In this case, the rubber impregnated portion 20 which is impregnated with the porous structure provided in the MPL layer 12 may be substituted with a rubber filled portion 19 which is filled in a through hole 12a previously provided in the MPL layer 12. According to the structure mentioned above, since the second step for temporarily placing is executed in a state in which the molded piece is supported by the leg portion 17, none of the MPL layer 12 and the gasket body 13 comes into contact with the placement stand 31. Therefore, it is possible to effectively protect the MPL layer 12 and the gasket body 13 from the foreign material attachment, the pollution and the scratching caused by the contact. Further, since the MPL layer 12 is protected by the protection film 34, it is possible to further efficiently protect the MPL layer 12. Since the protection film 34 is not adhered while being lapped over the MPL layer 12, the protection film 34 is removed together with the burr portion 16 in the third step. Further, the leg portion 17 can be utilized as a formed piece chuck portion at a time of mold releasing the molded piece from the metal mold 33.

The protection film 34 employs a film which is excellent in a mechanical strength and a heat resistance, for example, a polyimide resin (PI) film and a polyether ether ketone resin (PEEK) film, for preventing the film from being thermally deformed in the metal mold due to the mold clamping or the forming temperature. A thickness of the protection film 34 is generally set to about several tens μm.

In the case that the MPL layer 12 is coated with the protection film 34 such as the fifth embodiment mentioned above, it is necessary to pay attention to the following points.

Figure 10A:
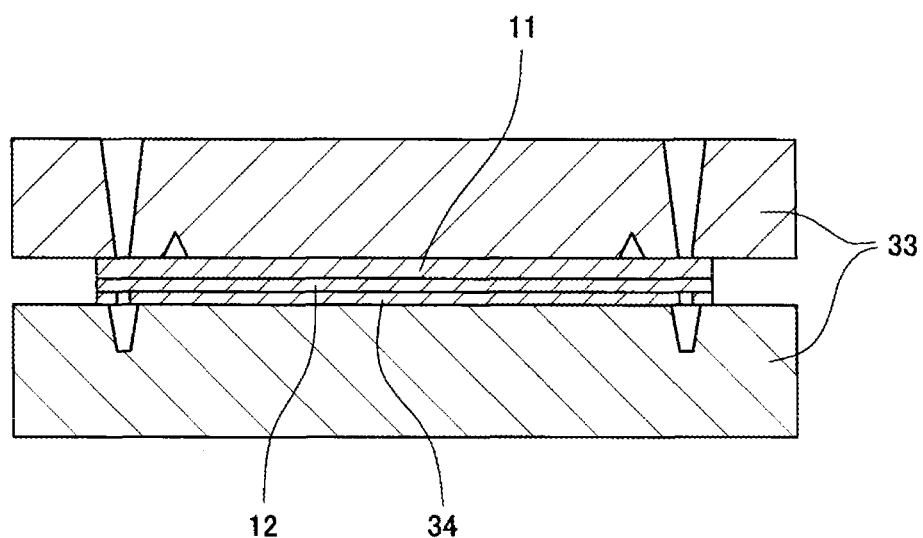
Figure 10B:
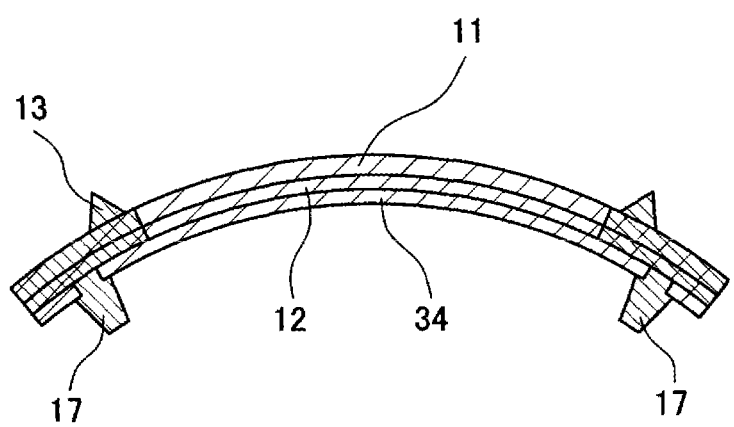

In other words, the molded piece (the GDL integrated seal) is injection molded by a metal mold 33 shown in FIG. 10A, however, if the leg portions 17 provided in two opposed sides in the GDL 11 are structured such as to constrain the protection film 34 on a plane, a deflection (a deflection or a deformation) may be generated in the molded piece in the thermal expansion as shown in FIG. 10B in the case that the protection film 34 and the GDL 11 have a difference in coefficient of thermal expansion.

Sixth Embodiment

Figure 11A:
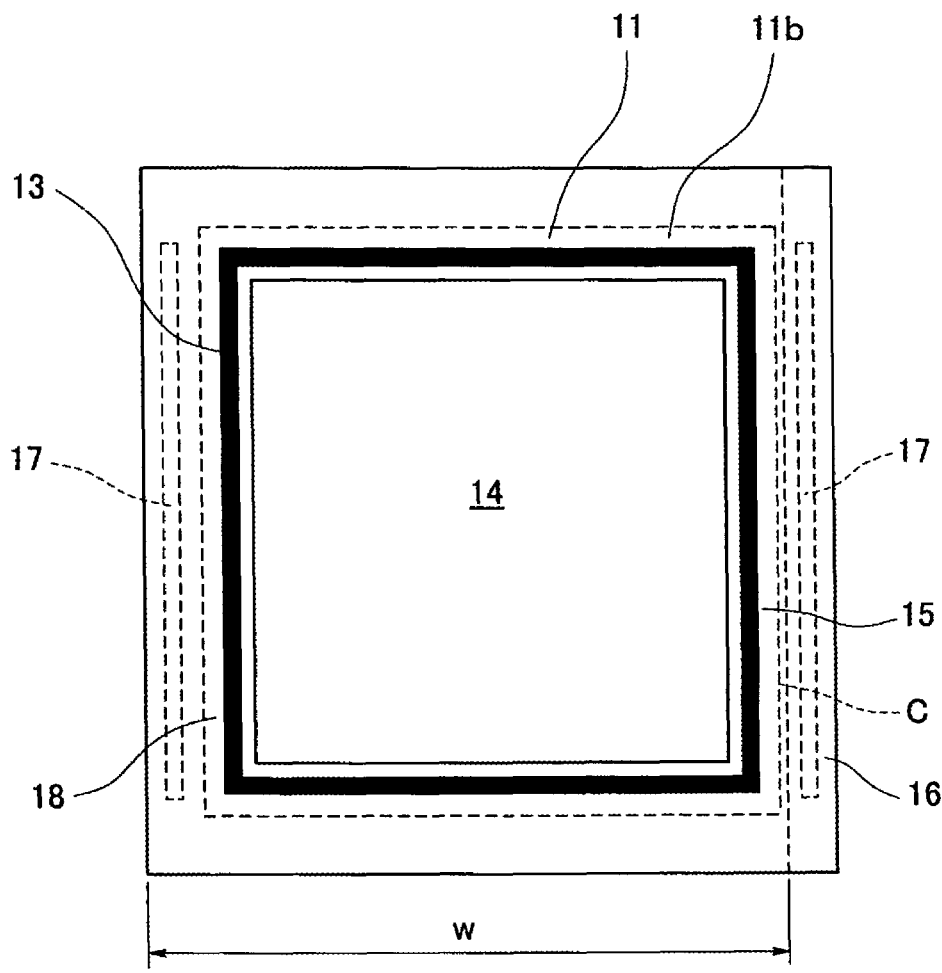
Figure 11B:
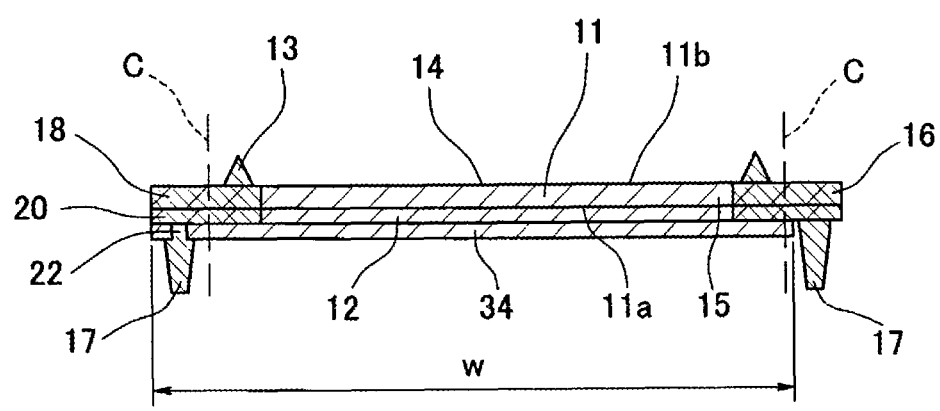
Figure 12:
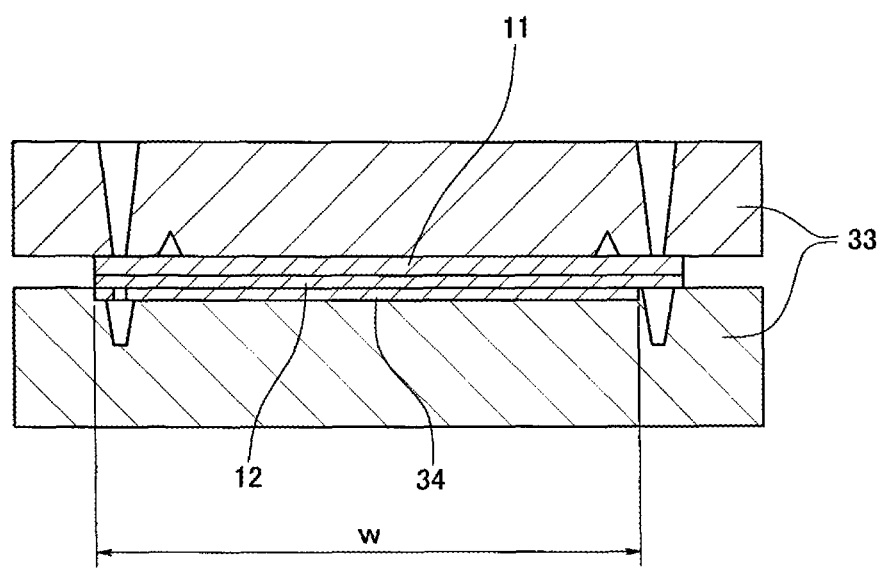
FIG. 12 is an explanatory view of the producing method according to the embodiment and is an explanatory view of a first step.
Figure 13A:
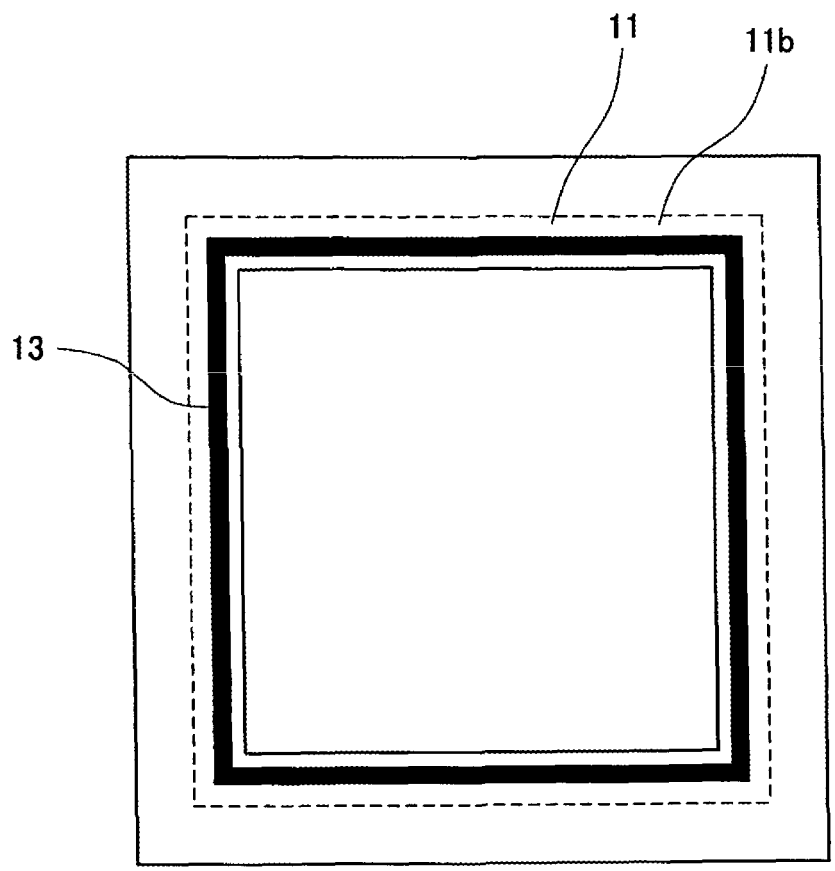
Figure 13B:
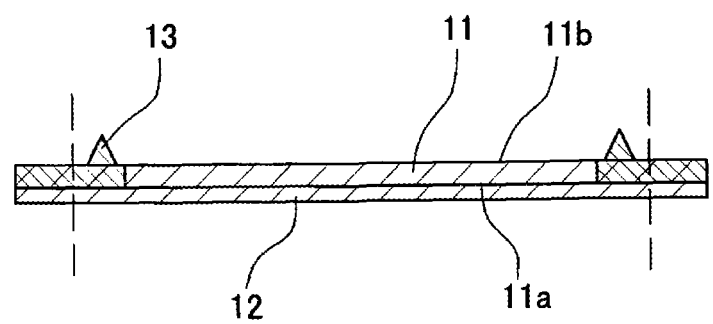
Figure 14:
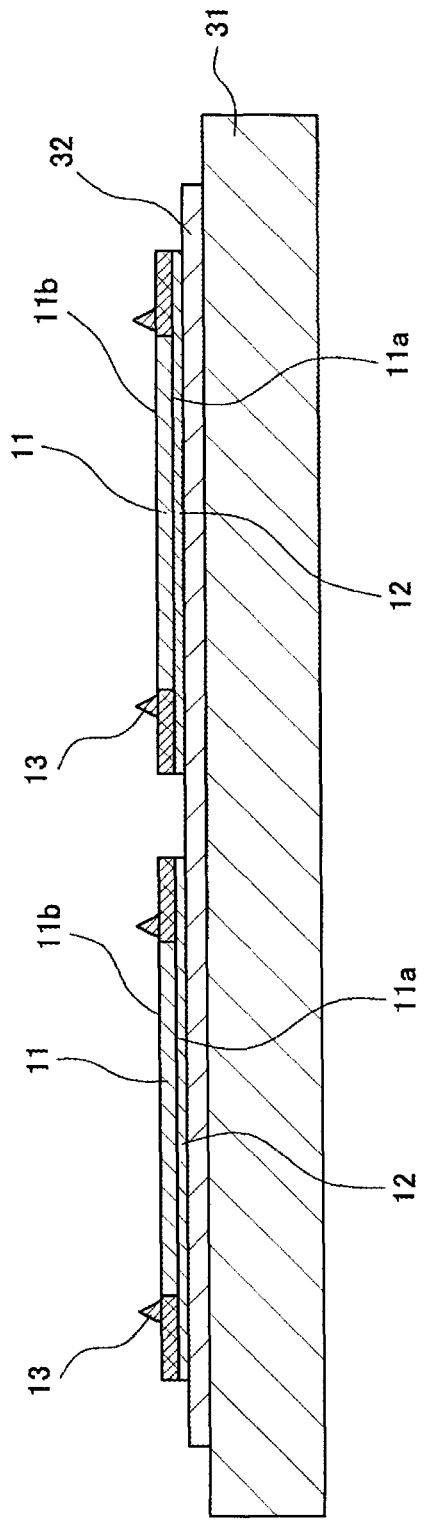
FIG. 14 is an explanatory view of the producing method according to the conventional example and is an explanatory view of a second step.

In order to prevent the generation of the deflection from being generated, as shown in FIGS. 11A and 11B and FIG. 12, there is employed a structure in which only one leg portion 17 constrains on plane the protection film 34 and the other leg portion 17 does not constrain on plane the protection film 34 (a structure in which the protection film 34 is held only by the one leg portion 17 and is not held by the other leg portion 17) by making a width w of the protection film 34 slightly shorter, thereby setting one end portion in a width direction of the protection film 34 to a free state in relation to the other leg portion 17. Therefore, according to the structure mentioned above, since the one end portion of the protection film 34 is set to the free state, and a distance between a pair of leg portions 17 and 17 is not defined by the protection film 34 having a smaller coefficient of thermal expansion, it is possible to prevent generation of the deflection as shown in FIG. 10B even if the difference in an amount of thermal expansion is generated between the protection film 34 and the GDL 11. In other words, the protection film 34 is structured such as to coat the MPL layer (the surface treated layer) 12 in a state in which the protection film 34 is held the one end thereof by the leg portion 17 and is free in the other end thereof without being held by the leg portion 17 by holding the protection film 34 by a part of the leg portion 17 in place of a whole of the leg portion 17 so as to prevent the deflection from being generated in the molded piece at a time of heating on the basis of the difference in coefficient of thermal expansion between the GDL (the substrate) 11 and the protection film 34. According to the structure mentioned above, it is possible to effectively prevent the deflection from being generated in the molded piece.

What is claimed is:

1. A method for producing a molded gasket which is provided with a surface treated layer on one surface in a thickness direction of a substrate and is structured such that a gasket body constructed by an elastic body is integrally formed on the other surface in the thickness direction, comprising:
    a first step of integrally molding said gasket body on said substrate which is provided with said surface treated layer;
    a second step of temporarily placing the molded piece finishing said first step on a placement stand;
    a third step of removing a burr portion in a peripheral edge from a production portion by punching the molded piece finishing said second step; and
    sequentially executing the first step, the second step and the third step,
    wherein said first step integrally forms a projecting leg portion constructed by an elastic body at a position corresponding to said burr portion in said molded piece, said second step brings said molded piece into contact with said placement stand by said leg portion, and said third step removes said leg portion as a part of said burr portion.

2. The producing method according to claim 1, wherein said leg portion is integrally molded on the other surface in the thickness direction on said substrate in the same manner as said gasket body, and said leg portion is formed in such a manner that a height dimension thereof becomes larger than that of said gasket body.

3. The producing method according to claim 2, wherein said leg portion and said gasket body are integrally molded via a rubber impregnated portion which is impregnated with a porous structure provided in said substrate.

4. The producing method according to claim 1, wherein said leg portion is integrally molded on the one surface in the thickness direction which is provided with said surface treated layer in said substrate in contradiction to said gasket body.

5. The producing method according to claim 4, wherein said leg portion and said gasket body are integrally formed via a rubber impregnated portion which is impregnated with a porous structure provided in said substrate, and a rubber filled portion which is filled in a through hole provided on said surface treated layer.

6. The producing method according to claim 4, wherein said leg portion and said gasket body are integrally molded via a rubber impregnated portion which is impregnated with a porous structure provided in said substrate, and a rubber impregnated portion which is impregnated with a porous structure provided in said surface treated layer.

7. The producing method according to claim 1, wherein said first to third steps are sequentially executed in a state in which said surface treated layer is coated with a protection film so as to protect said surface treated layer.

8. The producing method according to claim 7, wherein said leg portion is integrally formed on the one surface in the thickness direction which is provided with said surface treated layer in said substrate in contradiction to said gasket body, and said leg portion and said gasket body are integrally formed via a rubber impregnated portion which is impregnated with a porous structure provided in said substrate, a rubber impregnated portion which is impregnated with a porous structure provided in said surface treated layer, and a rubber filled portion which is filled in a through hole provided in said protection film.

9. The producing method according to claim 7, wherein said leg portion is integrally formed with the one surface in the thickness direction which is provided with said surface treated layer in said substrate in contradiction to said gasket body, and said leg portion and said gasket body are integrally formed via a rubber impregnated portion which is impregnated with a porous structure provided in said substrate, a rubber filled portion which is filled in a through hole provided in said surface treated layer, and a rubber filled portion which is filled in a through hole provided in said protection film.

10. The producing method according to claim 7, wherein said protection film is constrained only by a part of said leg portion in place of all of said leg portion, so as to prevent deflection from being generated at a time of thermal expansion while taking into consideration difference in coefficient of thermal expansion between said protection film and said substrate.

11. The producing method according to claim 8, wherein said protection film is constrained only by a part of said leg portion in place of all of said leg portion, so as to prevent deflection from being generated at a time of thermal expansion while taking into consideration difference in coefficient of thermal expansion between said protection film and said substrate.

12. The producing method according to claim 9, wherein said protection film is constrained only by a part of said leg portion in place of all of said leg portion, so as to prevent deflection from being generated at a time of thermal expansion while taking into consideration difference in coefficient of thermal expansion between said protection film and said substrate.

13. The producing method according to claim 1, wherein said substrate is a GDL in a fuel battery cell, and said surface treated layer is an MPL layer.

* * * * *